US009842296B2

(12) United States Patent
Clark et al.

(10) Patent No.: US 9,842,296 B2
(45) Date of Patent: *Dec. 12, 2017

(54) USING COHORTS IN A QUESTION ANSWERING SYSTEM

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US); Richard J. Stevens, Monkton, VT (US); Kathryn L. Whaley, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 14/492,661

(22) Filed: Sep. 22, 2014

(65) Prior Publication Data

US 2016/0078351 A1 Mar. 17, 2016

Related U.S. Application Data

(63) Continuation of application No. 14/489,124, filed on Sep. 17, 2014.

(51) Int. Cl.
| | | |
|---|---|---|
| G06N 5/04 | (2006.01) | |
| G06N 5/02 | (2006.01) | |
| G06F 17/30 | (2006.01) | |

(52) U.S. Cl.
CPC ......... *G06N 5/022* (2013.01); *G06F 17/3053* (2013.01); *G06N 5/041* (2013.01); *G06N 5/046* (2013.01)

(58) Field of Classification Search
USPC .......................................................... 706/11
See application file for complete search history.

(56) References Cited

U.S. PATENT DOCUMENTS

| | | | | |
|---|---|---|---|---|
| 5,908,383 A | * | 6/1999 | Brynjestad | ............ G06F 19/345 128/920 |
| 8,126,736 B2 | | 2/2012 | Anderson et al. | |
| 2006/0281977 A1 | | 12/2006 | Soppet | |

(Continued)

OTHER PUBLICATIONS

Fukumoto et al ("Interactive Document Expansion for Answer Extraction of Question Answering System" 2013).*

(Continued)

*Primary Examiner* — Lut Wong
(74) *Attorney, Agent, or Firm* — Martin & Associates, LLC; Bret J. Petersen (57) ABSTRACT

A cohort analysis mechanism analyzes cohorts with similar attributes to extrapolate additional knowledge and answer a question in a question answering system. The cohort analysis mechanism identifies cohorts for an entity of the question and extracts relevant data concerning the cohorts. The cohort analysis mechanism aggregates the relevant information for evidence scoring and answer scoring to answer a question posed to the question answering system. The aggregating of the data includes combining and ranking answers from the cohorts, gathering evidence and then answering the question with the gathered evidence.

11 Claims, 6 Drawing Sheets

(56) References Cited

U.S. PATENT DOCUMENTS

| | | |
|---|---|---|
| 2008/0208914 A1 | 8/2008 | Navani |
| 2011/0201900 A1 | 8/2011 | Zhang et al. |
| 2011/0251243 A1 | 10/2011 | Tucker et al. |
| 2012/0185266 A1 | 7/2012 | Trifunov |
| 2013/0085773 A1 | 4/2013 | Yao et al. |
| 2013/0085980 A1 | 4/2013 | Alemi |
| 2013/0185231 A1 | 7/2013 | Baras et al. |

OTHER PUBLICATIONS

Roitman et al ("Exploratory Search Over Social-Medical Data" 2011).*

Ahmed et al ("Case-based Reasoning for Diagnosis of Stress using Enhanced Cosine and Fuzzy Similarity" 2008).*

Celi et al ("Dynamic Clinical Data Mining: Search Engine-Based Decision Support" 2014).*

Clark et al., "Using Cohorts in a Question Answering System" U.S. Appl. No. 14/489,124, filed Sep. 17, 2014.

List of IBM Patents or Patent Applications Treated As Related.

Clark et al., "Using Cohorts to Infer Attributes for an Input Case in a Question Answering System" U.S. Appl. No. 14/626,052, filed Feb. 19, 2015.

Clark et al., "Using Cohorts to Infer Attributes for an Input Case in a Question Answering System" U.S. Appl. No. 14/658,973, filed Mar. 16, 2015.

Fukumoto et al., Interactive Document Expansion for Answer Extraction of Question Answering System, 17th Int'l Conference in Knowledge Based and Intelligent Information and Engineering Systems, 2013.

Lally et al., "WatsonPaths: Scenario-based Question Answering and Inference over Unstructured Information", Sep. 17, 2014.

Roitman et al., "Exploratory Search Over Social-Medical Data", 2011.

* cited by examiner

USING COHORTS IN A QUESTION ANSWERING SYSTEM

BACKGROUND

1. Technical Field

This invention generally relates to computer question answering systems, and more specifically relates to analyzing cohorts with similar attributes to extrapolate additional knowledge in a question answering system.

2. Background Art

A significant purpose for computer systems is the retrieval of relevant information or documents from a store of knowledge. The typical information retrieval system provides a document or file in response to a specific query or link. Question Answering (QA) is a specific type of information retrieval that deals with returning information in response to a natural language question. A QA response attempts to return a specific answer such as a word or phrase to a question such as "who", "where" or "what". One example of a QA system is the Deep Question Answering system, called "Watson", developed by International Business Machines (IBM) Corporation of Armonk, N.Y. A user may submit a natural language question (also referred to as a case) to Watson, which will then provide an answer to the question based on an analysis of a corpus of information.

A QA system like Watson has application in the medical field due to the ability to process and relate large amounts of information. For example, QA can determine an appropriate cancer treatment for a patient based on the patient's medical history from knowledge stored in the database. While QA can identify knowledge stored in a large corpus using natural language processing to interpret the English language, it is not, designed to provide an answer when knowledge is non-existent, such as when the corpus does not contain sufficient knowledge to answer the question. When a question is posed about a topic that is not available in a corpus, typically QA is at a loss to confidently answer the question.

BRIEF SUMMARY

The disclosure and claims herein relate to a cohort analysis mechanism that analyzes cohorts with similar attributes to extrapolate additional knowledge and answer a question in a question answering system. The cohort analysis mechanism identifies cohorts for an entity of the question and extracts relevant data concerning the cohorts. The cohort analysis mechanism aggregates the relevant information for evidence scoring and answer scoring to answer a question posed to the question answering system. The aggregating of the data includes combining and ranking answers from the cohorts, gathering evidence and then answering the question with the gathered evidence.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and.

DETAILED DESCRIPTION

The disclosure and claims herein relate to a cohort analysis mechanism that analyzes cohorts with similar attributes to extrapolate additional knowledge and answer a question in a question answering system using an aggregation of data from the cohorts. The cohort analysis mechanism identifies cohorts for an entity of the question and extracts relevant data concerning the cohorts. The cohort analysis mechanism aggregates the relevant information for evidence scoring and answer scoring to answer a question posed to the question answering system. The aggregating of the data includes combining and ranking answers from the cohorts, gathering evidence and then answering the question with the gathered evidence.

Figure 1:
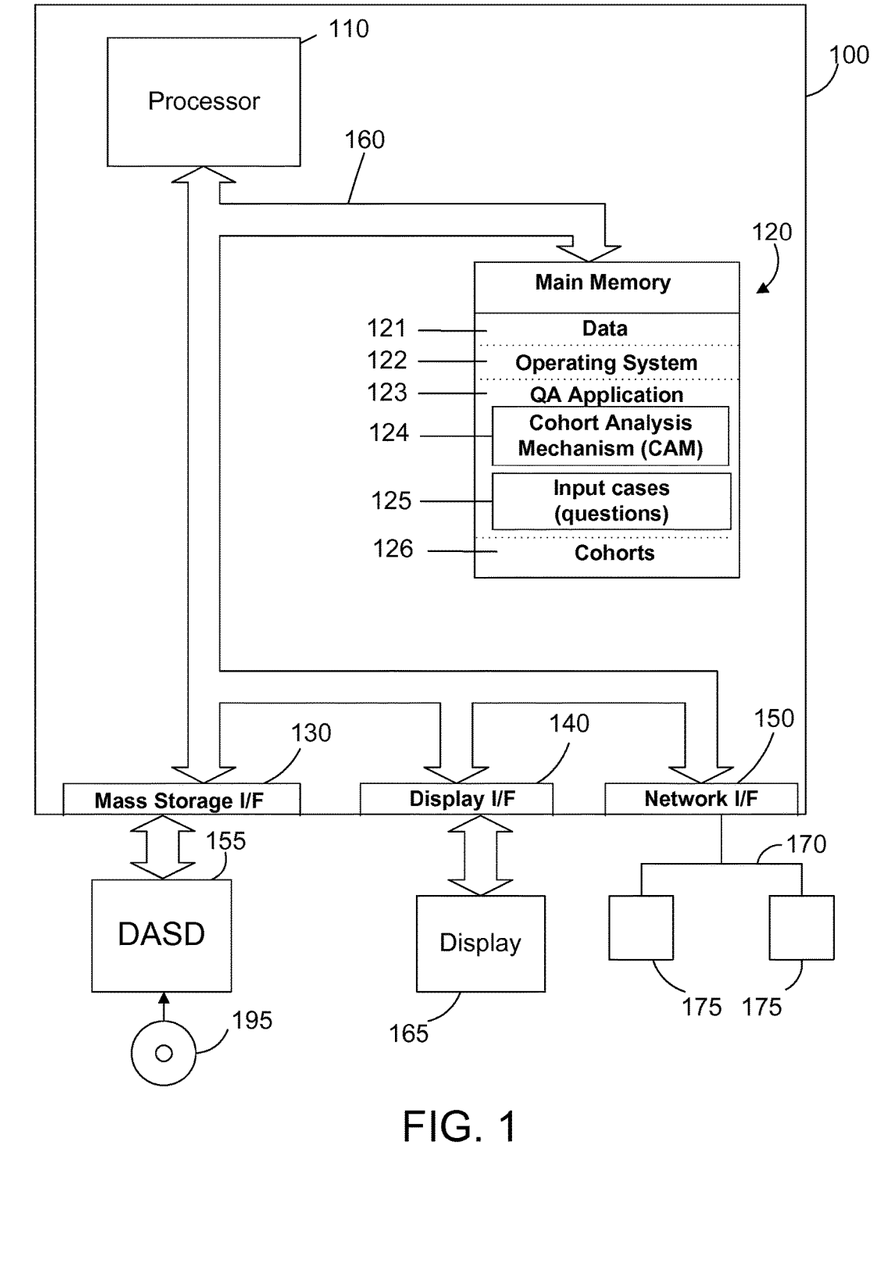
FIG. 1 illustrates a block diagram of a computer system apparatus with a question answering application having a cohort analysis mechanism as described herein.

Referring now to FIG. 1, a computer system 100 is one suitable implementation of an apparatus in accordance with the preferred embodiments of the invention. Computer system 100 represents a computer system such as a Power System by International Business Machines Corporation (IBM). However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices such as a direct access storage device (DASD) 155 to computer system 100. One specific type of direct access storage device 155 is a readable and writable CD RW drive, which may store data to and read data from a CD RW 195. Alternatively, the DASD may be a storage device such as a magnetic disk drive or a solid state disk drive.

Main memory 120 in accordance with the preferred embodiments contains data 121, and an operating system 122. Data 121 represents any data that serves as input to or output from any program in computer system 100. Operating system 122 represents an appropriate multitasking operating system known in the industry such as "IBM i", AIX (Advanced Interactive eXecutive) or Linux; however, those skilled in the art will appreciate that the spirit and scope of the present invention is not limited to any one operating system. The main memory 120 also includes a Question Answering (QA) application 123 that includes a cohort analysis mechanism (CAM) 124. The CAM analyzes input cases 125 to find cohorts 126 as described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155.

Therefore, while data 121, operating system 122, QA application 123, the CAM 124, questions 125 and cohorts 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the cohort analysis mechanism may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

Figure 2:
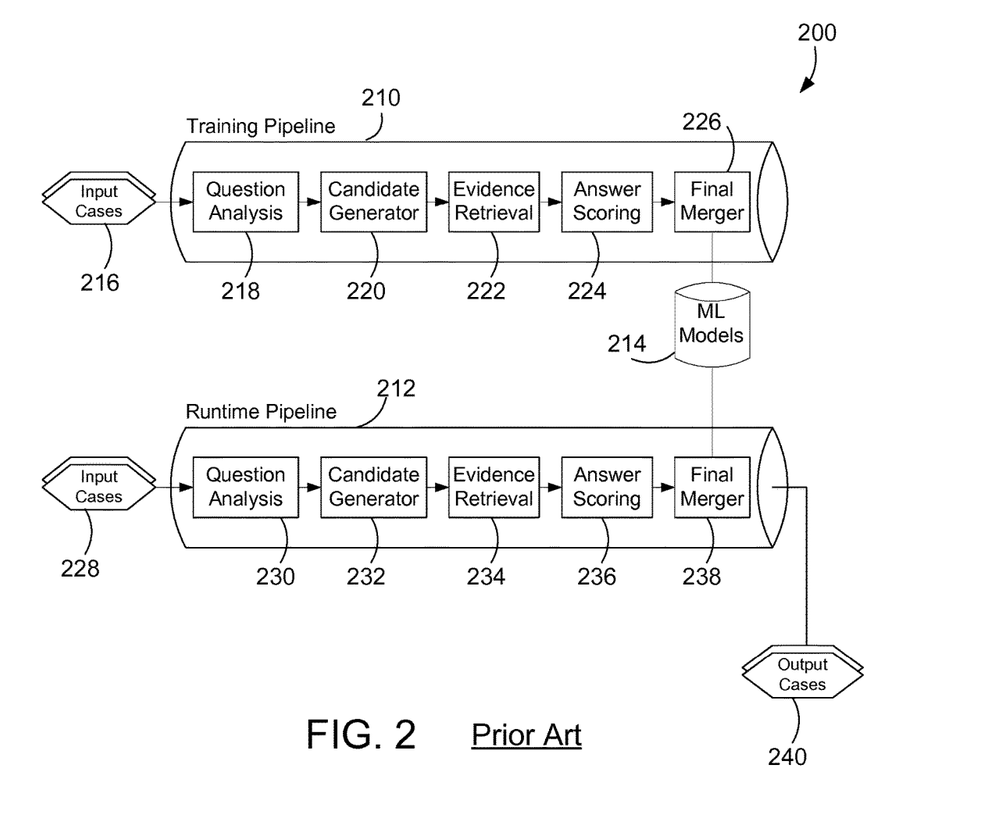
FIG. 2 illustrates a block diagram of a question answering system as known in the prior art.

FIG. 2 illustrates a simplified block diagram of a question answering system 200 as known in the prior art. In this example, the question answering (QA) system 200 is divided into a training pipeline 210 and a runtime pipeline 212. The training pipeline is used to train the system and build machine learning (ML) models 214. The ML models 214 are then used in the runtime pipeline 212. To train the QA system 200, questions referred to as input cases 216 are applied to a question analysis block 218. During question analysis the system attempts to understand what the question is asking and performs the initial analyses that determine how the question will be processed by the rest of the system.

After question analysis, the system passes the question to the candidate generator 220. In the candidate generator 220, a search is performed to find as much potentially answer-bearing content as possible. Techniques appropriate to the kind of search results are applied to the search results to generate candidate answers. Search results from the candidate generator 220 are passed to the evidence retrieval block 222. To better evaluate each candidate answer, the system gathers additional supporting evidence. This evidence is passed to the answer scoring block 224. In the answer scoring block 224 the bulk of the deep content analysis is performed. Scoring algorithms determine the degree of certainty that retrieved evidence supports the candidate answers. The QA system may include many different components, or scorers, that consider different dimensions of the evidence and produce a score that corresponds to how well evidence supports a candidate answer for a given question. After answer scoring is the final merger block 226. The goal of final merging is to evaluate the hundreds of hypotheses based on potentially hundreds of thousands of scores to identify the single best-supported hypothesis given the evidence and to estimate its confidence, which is the likelihood it is correct. After answer scoring the ML models are created. The ML models 214 assign weights to the systems various analysis programs according to how well they predict correct answers for the case.

Again referring to FIG. 2, the question answering system 200 further includes a runtime pipeline 212. The runtime pipeline is in many ways similar to the training pipeline 210. The runtime pipeline inputs cases 228 to a question analysis block 230 and the question analysis block feeds a candidate generator block 232. Similar to the training pipeline, the runtime pipeline includes an evidence retrieval block 234, an answer scoring block 236 and a final merger block 238. The final merger block 238 uses the ML models 214 created by the training pipeline 210. The runtime pipeline 212 produces output cases 240.

Figure 3:
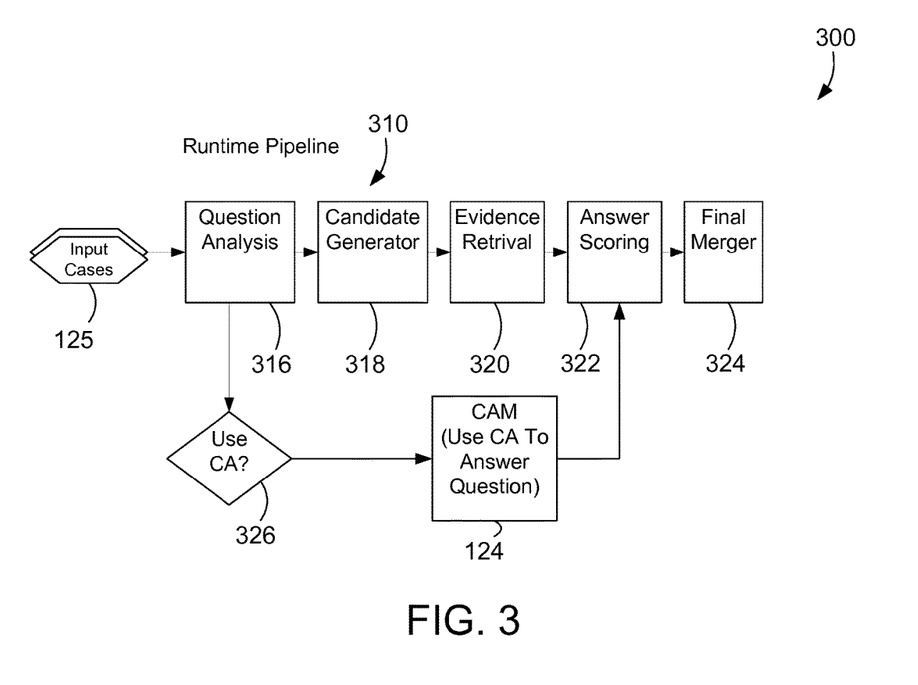
FIG. 3 illustrates a block diagram of a question answering system with a cohort analysis mechanism as described herein.

FIG. 3 illustrates a block diagram representing an example of a question answering system 300 that utilizes cohort analysis as claimed herein. The question answering system 300 may also incorporate a training pipeline 210 as described in FIG. 2, however a training pipeline is not shown here for simplicity. The question answering system 300 includes a runtime pipeline 310 with input cases 314 to the pipeline in a similar manner as the prior art. The runtime pipeline 310 includes blocks 316, 318, 320, 322, 324 similar to the prior art with the additional blocks 326 and 124 as described further herein. The input cases are applied to a question analysis block 316. After question analysis, the system passes the question to the candidate generator 318. Search results from the candidate generator 318 are passed to the evidence retrieval block 320. Retrieved evidence is passed to the answer scoring block 322. After evidence scoring is the final merger block 324. Each of these blocks may perform in a similar way to the prior art discussed with respect to FIG. 2. These blocks also work in conjunction with the cohort analysis mechanism to use cohort analysis to answer a question as described herein.

In the illustrated example in FIG. 3, the runtime pipeline at some point determines whether to use cohort analysis 326 to assist in answering the input case or question. This determination could be done in conjunction with the question analysis block 316 or it could be done by the question analysis block 326. In the alternative, this initial determination to use cohort analysis at 326 could be considered part of the CAM 124. The determination to use cohort analysis may depend on the type of question and the type of data available to the system. For example, cohort analysis may be attempted for questions of a specific type where sufficient data is available. For example, data in the corpus may be determined to be sufficient where there are cohorts in the corpus with at least 90% of the attributes identified in the input case or where the most critical attributes are in the cohort regardless of the total percentage of attributes. If there is insufficient data cohort analysis would be aborted. If there is sufficient data the case would be presented to the cohort analysis mechanism (CAM) 124. The CAM 124 uses cohort analysis to answer the question as described herein. In summary, the CAM 124 identifies cohorts for the entity of the question, extracts data from the cohorts, combines and ranks answers from the cohorts, gathers evidence and then answers the question with the aggregated evidence. These steps are further described and illustrated below. After using cohort analysis to answer the question, the answer can be sent to the answer scoring block 322. The answer scoring block 322 can optionally use the answer from the CAM 124 combined with answers using conventional QA analysis from evidence retrieval block 320 for the same input case to answer the question.

As introduced above, the input case or question is analyzed to determine if cohort analysis can be used. Part of this analysis may include determining if the question deals with an entity that has available cohorts. As used herein, a cohort is an entity for which there is data for similar entities in the corpus of data available to the QA system. Entities for which cohort analysis could be applied may include patients, people in general, animals, computer components, etc. Identifying cohorts entails finding entities in the corpus of data available to the QA system that are similar to the one in the input case. The CAM matches attributes from the question or input case to similar entities available in the corpus of data using "fuzzy" matching. Fuzzy matching may be accomplished, for example, with a threshold percentage. Thus cohorts are similar entities that meet a threshold of attributes similar to the input case where the threshold may be a reference percentage. The cohorts may then be divided into relative strengths such as "strong", "medium" and "weak" for different percentage thresholds. The relative strength of the cohorts can then be used to score the answers and evidence.

After the CAM 124 identifies cohorts for the entity of the question, it extracts data from the cohorts that were identified. This data typically includes potential answers for the question and the associated evidence. For example, common answers are combined and ranked according to occurrence in the data. The ranking can then be used to gather the statistically most significant evidence to answer the question and give a confidence score for the answer. The answers can be scored by a confidence in the answer. Confidence in cohort attributes is a direct result of statistical analysis of the cohesion of values for the cohort. The confidence for an answer is the statistical likelihood that the most frequent value for that attribute is correct given the size of the cohort and the number of cases in the cohort with the same value.

Figure 4:
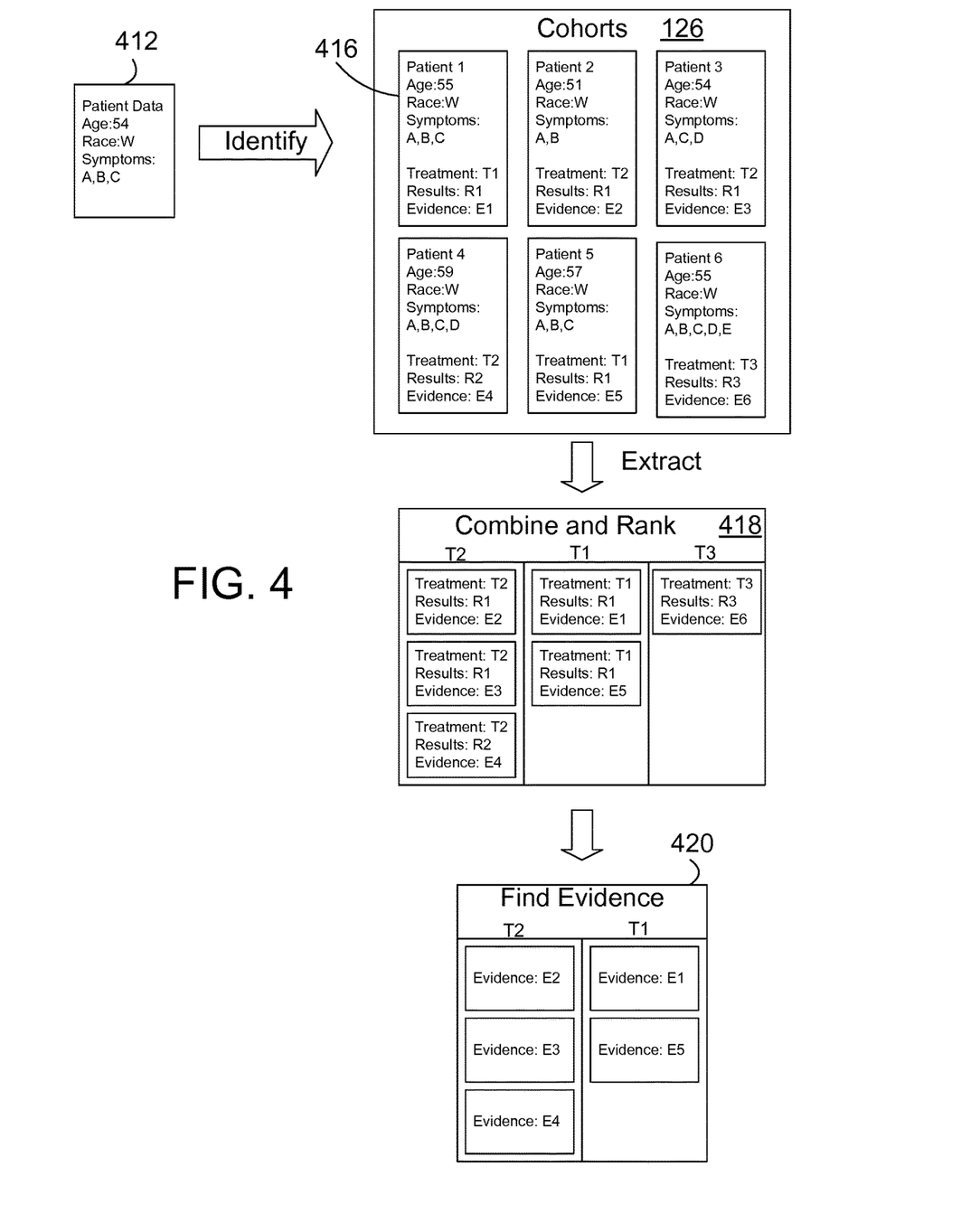
FIG. 4 illustrates a block diagram of an example using a cohort analysis mechanism as described herein.

FIG. 4 illustrates a simplified example of cohort analysis by the CAM 124 (FIG. 2) to answer a question in a question answering system as described herein. In this example, we assume the question is "What is the best treatment for a 54 year old, white male with symptoms A, B and C?" The CAM determines that the question concerns a medical patient that has sufficient data in the corpus of the data available to use cohort analysis. The first step is to identify cohorts that are similar to the one in the input case 412. The CAM identifies cohorts 126 for the patient of the input case 412. The cohorts 126 include 6 patients that have similar age, race and symptoms as the input case 412. Each cohort record also includes the treatment, results and evidence. For example, the cohorts 126 includes a record for Patient 1 where Patient 1 is age 55, race "White", with symptoms A, B, C. The record for Patient 1 416 further includes treatment T1, results R1 and evidence E1. Similarly there are records for cohorts identified as Patient 2 through Patient 6. In this example a small number of cohorts are shown for simplicity. However, in actual use the number of cohorts would preferably be much larger to get more accurate results. The CAM then extracts data 418 from the cohorts that were identified. In this example, the data 418 extracted is a treatment used for each cohort, the results and evidence. This extracted data 418 is combined and ranked according to occurrence in the data. In this example, we combine and rank the cohort data according to the treatment. Thus treatment T2 is ranked highest with three similar cohorts, treatment T1 with two similar cohorts and treatment T3 with one similar cohort. This ranking is then be used to gather the statistically significant evidence to answer the question and give a confidence score for the answer.

Again referring to FIG. 4 the CAM gathers the statistically significant evidence to answer the question from the cohort data 418 to give a confidence score for the answer. Evidence for each cohort is a piece of data that corroborates the results of the answer. In this example, we gather evidence for treatment 2 because it is statistically significant to our input case where ranked cohort data shows treatment 2 was found most often. The evidence for each cohort with treatment 2 is compared. What ever evidence is common or most occurring in evidence for the ranked treatment would be considered to be statistically significant. In this example, evidence E2, E3 and E4 is compared and common evidence in E2, E3 and E4 will be returned at 420 as answering the question with the most confidence. Evidence within E2, E3 and E4 that is not common could be returned with a lower confidence rating.

The typical prior art QA system analyzes each piece of data individually and ranks answers based on the number of pieces of matching data and the quality of matching data found in the corpus. The prior art has no mechanism to differentiate significant vs insignificant characteristics to know what aspects of the current record (such as a patient) matter. By first producing cohorts, the characteristics shared by every patient in the cohort or nearly every patient can be singled out as key characteristics. This, in effect, generalizes individual patients into fuzzy groups (cohort) that may lack specific details, but still represents a subset of characteristics that share some common outcome. The lack of detail is replaced by the size/cohesion of the cohort. Using cohorts as described allows the QA system to replace confidence due to complexity of match with confidence due to frequency of matching a less-complex pattern or partial match.

FIG. 4 further illustrates an example how the CAM and processing cohorts as described herein has advantages over prior art question answering systems. The CAM first identifies cohorts for an entity in the question or input case. By identifying cohorts that have similar attributes of the entity of the input case, the CAM is able to draw on significant evidence that may be disregarded in the prior art. For example, if the prior art QA system were to process the data shown in FIG. 4 using the attributes of symptoms A, B and C, the prior art system may only consider patients 1 and 5 that have the same symptoms. The answer by the prior art system may or may not be the ideal answer since it would lead the prior art QA system to ignore the possibility of treatment T2 as an option for treatment of the patient. As described above, the CAM uses a variety of attributes to identify cohorts of the input case and does not require an exact match of the case attributes (in this case the symptoms) between the cohorts and the question. By identifying the cohorts shown in FIG. 4, the CAM is able to determine that treatment T2 from patients 2, 3 and 4 is a valuable option to consider for treatment despite the fact that the case attributes (symptoms) do not match exactly.

Figure 5:
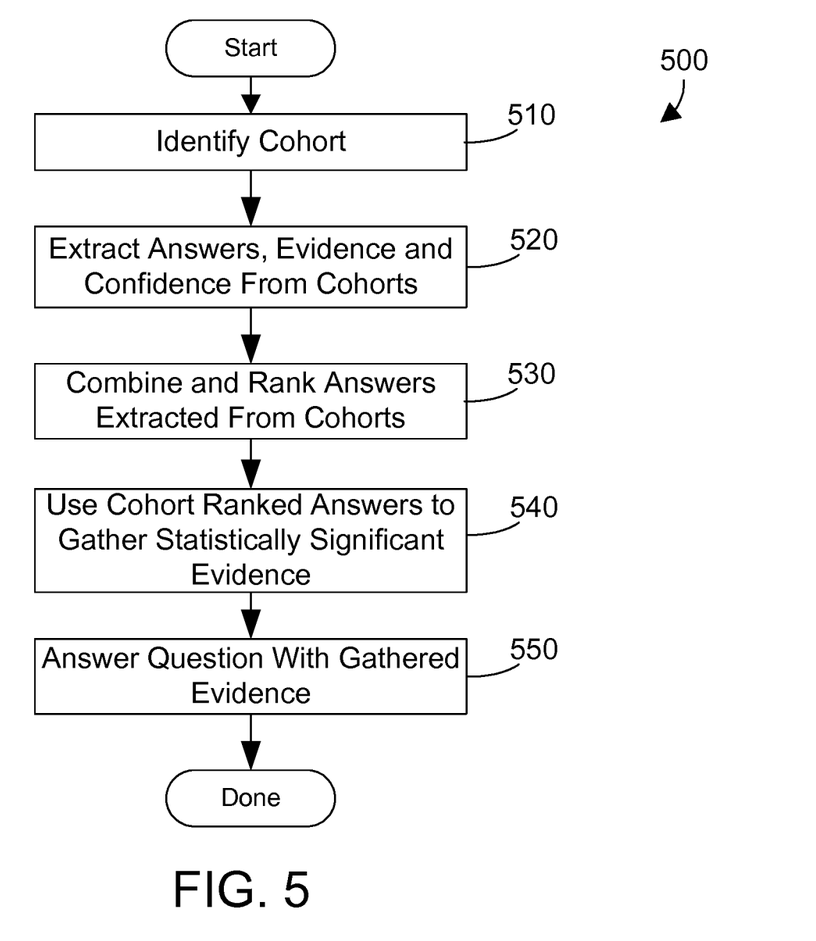
FIG. 5 is a flow diagram of a method for analyzing cohorts to answer a question in a question answering system.

Referring now to FIG. 5, a flow diagram shows a method 500 for using cohort analysis in a question answering system. The steps of method 500 are preferably performed by the cohort analysis mechanism (CAM) 124 as part of a question answering system as described above. First look at the input case and identify cohorts of the entity of the input case or question (step 510). Next, extract answers, evidence and confidence from the identified cohorts for the input case (step 520). Combine and rank the answers extracted from the cohorts of the input case (step 530). Use the cohort ranked answers to gather statistically significant evidence for the ranked answers (step 540). Answer the question with the gathered evidence (step 550). The method 500 is then done.

Figure 6:
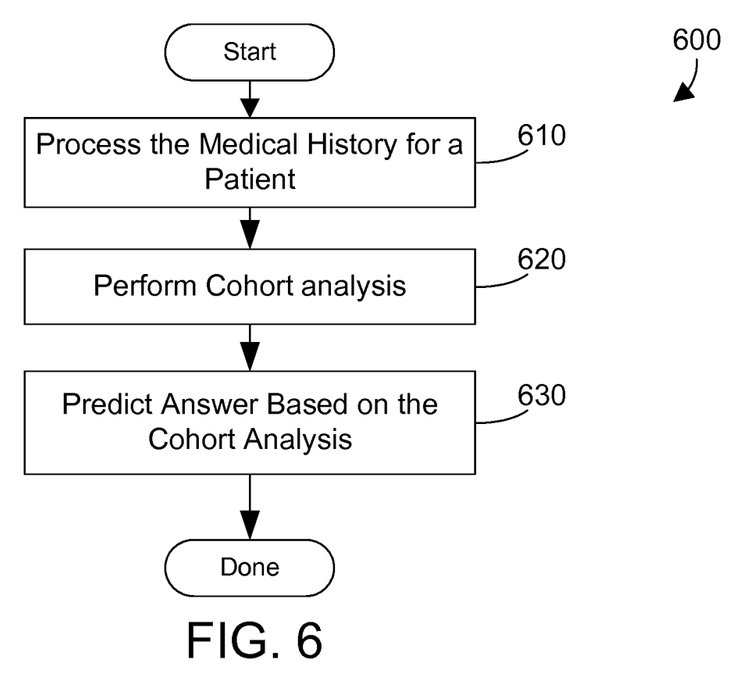
FIG. 6 is an example flow diagram to answer a medical question using cohort analysis.

Referring now to FIG. 6, a flow diagram shows a method 600 for using cohort analysis to answer a question in a question answering system. The steps of method 600 are preferably performed by the cohort analysis mechanism as described above. First process the medical history for a patient (step 610). Use cohort analysis and the steps of method 500 to perform cohort analysis (step 620). Then predict an answer to the input case based on the cohort analysis (step 630). The method is then done.

The present invention may be a system, a method, and/or a computer program product. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The disclosure and claims are directed to a cohort analysis mechanism that uses cohort analysis in a question answering system. The cohort analysis mechanism identifies cohorts for an entity of the question, extracts data from the cohorts, combines and ranks answers from the cohorts, gathers evidence and then answers the question with the gathered evidence.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A method for analyzing cohorts to answer a question in a question answering system, the method comprising the steps of:
   identifying the cohorts for a person in the question, wherein the cohorts are persons meeting a threshold of similar attributes to the person of the question and available in a corpus of data to answer the question;
   extracting answers and evidence from data of the cohorts;
   combining and ranking the extracted answers and evidence from the cohorts;
   using the combined and ranked answers and evidence to gather statistically significant evidence; and
   answering the question with the gathered statistically significant evidence.

2. The method of claim 1 wherein the cohort analysis mechanism is part of a question answering application that answers a natural language question.

3. The method of claim 1 wherein the person in the question is a patient, the question is a medical question for the patient and the cohort analysis mechanism processes the medical history of the patient and finds the cohorts from medical histories of other patients to predict an answer from the cohorts.

4. The method of claim 1 wherein the cohort analysis mechanism determines an answer to the question using evidence gathered from a set of cohorts where case attributes in the set of cohorts does not match exactly attributes of the person in the question.

5. The method of claim 4 wherein the question is a medical question for a patient and the cohort analysis mechanism processes the medical history of the patient and finds the cohorts from medical histories of other patients to predict an answer from the cohorts.

6. The method of claim 5 wherein the cohort analysis mechanism combines the answer from the cohorts with answers using conventional question answering in an answer scoring block of a conventional question answering system to answer the question.

7. The method of claim 1 wherein the attributes include age, race and symptoms.

8. The method of claim 1 wherein the threshold is a reference percentage allowing the cohorts to be divided into relative strengths for different percentage thresholds and wherein the relative strengths of the cohorts are used to score the answers and evidence.

9. A method for analyzing cohorts to answer a question in a question answering system, the method comprising the steps of:
   providing a cohort analysis mechanism that executes on at least one processor that analyzes cohorts with similar attributes, wherein the cohorts are persons meeting a threshold of similar attributes to a person in the question and available in a corpus of data, wherein the cohort analysis mechanism is part of a question answering application that answers a natural language question;
   analyzing the cohorts to answer the question comprising:
      identifying the cohorts for the person in the question;
      extracting answers and evidence from data of the cohorts;
      combining and ranking the extracted answers and evidence from the cohorts;
      using the combined and ranted answers and evidence to gather statistically significant evidence;
      answering the question with the gathered statistically significant evidence;
   wherein the cohort analysis mechanism determines an answer to the question using evidence gathered from a set of cohorts where case attributes in the set of cohorts does not exactly match attributes of the question;
   wherein the question is a medical question for a patient and the cohort analysis mechanism processes the medical history of the patient to find attributes of the patient and searches the medical histories of other patients to identify cohorts that are patients meeting the threshold of similar attributes where the attributes include age and symptoms; and
   wherein the cohort analysis mechanism combines the answer from the cohorts with answers using conventional question answering in an answer scoring block of a conventional question answering system to answer the question.

10. A method for analyzing cohorts to answer a question in a question answering system, the method comprising the steps of:
    providing a cohort analysis mechanism that executes on at least one processor that analyzes cohorts with similar attributes, wherein the cohorts are animals meeting a threshold of similar attributes to an animal in the question and available in a corpus of data, wherein the cohort analysis mechanism is part of a question answering application that answers a natural language question;
    analyzing the cohorts to answer the question comprising:
       identifying the cohorts for the animal in the question;
       extracting answers and evidence from data of the cohorts;
       combining and ranking the extracted answers and evidence from the cohorts;
       using the combined and ranted data from the cohorts to gather statistically significant evidence;
       answering the question with the gathered statistically significant evidence;
    wherein the cohort analysis mechanism determines an answer to the question using evidence gathered from a set of cohorts where case attributes in the set of cohorts does not exactly match attributes of the question; and
    wherein the cohort analysis mechanism combines the answer from the cohorts with answers using conventional question answering in an answer scoring block of a conventional question answering system to answer the question.

11. The method of claim 10 wherein the threshold is a reference percentage allowing the cohorts to be divided into relative strengths for different percentage thresholds and wherein the relative strengths of the cohorts are used to score the answers and evidence.

* * * * *